US012600304B2

(12) United States Patent
Lambert et al.

(10) Patent No.: US 12,600,304 B2
(45) Date of Patent: Apr. 14, 2026

(54) WASTE WATER CONTAINER CAMPER TRANSPORT RACK

(71) Applicants: Ronny Wayne Lambert, Coalgate, OK (US); Dustin Layne Lambert, Coalgate, OK (US)

(72) Inventors: Ronny Wayne Lambert, Coalgate, OK (US); Dustin Layne Lambert, Coalgate, OK (US)

( * ) Notice: Subject to any disclaimer, the term of this patent is extended or adjusted under 35 U.S.C. 154(b) by 44 days.

(21) Appl. No.: 18/831,040

(22) Filed: May 13, 2024

(65) Prior Publication Data

US 2025/0346194 A1 Nov. 13, 2025

(51) Int. Cl.
 *B60R 9/06* (2006.01)
 *B60R 15/00* (2006.01)

(52) U.S. Cl.
 CPC ............... *B60R 9/06* (2013.01); *B60R 15/00* (2013.01)

(58) Field of Classification Search
 CPC ................................. B60R 9/06; B60R 15/00
 USPC .......................................................... 224/524
 See application file for complete search history.

(56) References Cited

U.S. PATENT DOCUMENTS

| | | | | |
|---|---|---|---|---|
| 1,467,504 A | * | 9/1923 | Sabarros ............... | B60P 1/4407 |
| | | | | 414/438 |
| 1,792,586 A | * | 2/1931 | Higgins ................... | B60P 1/04 |
| | | | | 224/508 |

| | | | | |
|---|---|---|---|---|
| 2,411,821 A | * | 11/1946 | Choat ................... | B60P 1/5428 |
| | | | | 414/541 |
| 2,930,500 A | * | 3/1960 | Ellis .......................... | B60R 9/02 |
| | | | | 193/38 |
| 3,822,801 A | * | 7/1974 | Morgan, Jr. .............. | B60R 9/06 |
| | | | | 224/567 |
| 3,981,323 A | | 9/1976 | Watson | |
| 4,744,590 A | * | 5/1988 | Chesney ................... | B60R 9/06 |
| | | | | 224/520 |
| 5,029,740 A | * | 7/1991 | Cox ........................ | B60R 9/065 |
| | | | | 224/535 |
| 5,219,105 A | * | 6/1993 | Kravitz ..................... | B60R 9/10 |
| | | | | 224/511 |
| 7,244,090 B2 | * | 7/2007 | Wooten ................ | B62D 43/002 |
| | | | | 414/466 |
| 7,296,959 B2 | * | 11/2007 | Davis ........................ | B60R 9/06 |
| | | | | 224/502 |
| 9,221,401 B1 | * | 12/2015 | Birkenstock ............ | B60R 15/00 |
| 9,663,039 B2 | * | 5/2017 | Marmon .................. | B60D 1/58 |
| 9,889,786 B1 | * | 2/2018 | Stojkovic .............. | B60P 1/4407 |
| D863,710 S | * | 10/2019 | Stoner ............................ | D34/28 |
| 10,486,610 B1 | * | 11/2019 | Owens ....................... | B60R 9/06 |
| 11,858,404 B2 | * | 1/2024 | Christian .................. | B66F 7/28 |
| 2006/0104767 A1 | * | 5/2006 | Dugger ..................... | B60R 9/06 |
| | | | | 414/462 |
| 2006/0182571 A1 | * | 8/2006 | Hightower ............. | A01K 15/00 |
| | | | | 414/466 |
| 2007/0221695 A1 | * | 9/2007 | Winkler .................. | B60R 9/065 |
| | | | | 224/511 |

(Continued)

*Primary Examiner* — Nathan J Newhouse
*Assistant Examiner* — Lester L Vanterpool
(74) *Attorney, Agent, or Firm* — Randal D. Homburg

(57) ABSTRACT

A portable waste tank transport device for transport of a portable waste tank attaches to a camper and provides the tank transport device with a platform upon which to load and transport the portable waste tank to a sanitary disposal location for the transfer of the contents of the portable waste tank to and from the sanitary disposal location during a camping event.

3 Claims, 6 Drawing Sheets

(56)          References Cited

U.S. PATENT DOCUMENTS

2008/0035654 A1     2/2008  Hall
2011/0210152 A1 *   9/2011  Williams  ................. B60R 9/06
                                                  224/400
2024/0425121 A1 *  12/2024  Mathews  ............ B62D 43/002

* cited by examiner

WASTE WATER CONTAINER CAMPER TRANSPORT RACK

CROSS REFERENCE TO RELATED APPLICATIONS

None.

I. BACKGROUND OF THE INVENTION

1. Field of Invention

A portable waste tank transport device attaches to a camper for the transport of a portable waste tank during a camping event, for the purpose of transferring the portable waste tank to a location where an approved sanitary disposal station or location for disposal of the contents of the portable waste tank, the portable waste tank transport device having a lower platform moved between a raised position for transport and a lowered position, resting upon the ground, for loading and unloading of the portable waste tank.

2. Description of Prior Art

A preliminary review of prior art patents was conducted by the applicant which reveal prior art patents in a similar field or having similar use. However, the prior art inventions do not disclose the same or similar elements as the present camper waste water container transport rack, nor do they present the material components in a manner contemplated or anticipated in the prior art.

In U.S. Patent Publication No. 2008/0035654 to Hall, the type of portable waste transfer tank disclosed in the present transport rack is similar to the type of transfer tank intended for use with the present transport rack and will be illustrated in the drawing figures made part of the specification. U.S. Pat. No. 3,981,323 to Watson illustrates a waste fluid holding tank for removable installation underneath a camper held onto the underside of the camper floor by U-shaped support straps. A telescoping bracket assembly for vehicle waste tanks is shown in U.S. Pat. No. 9,221,401 to Birkenstock, which shows an angular telescoping bracket assembly which accepts and directs the wheels of a liquid waste storage tank onto the tracks of the bracket assembly, after which the bracket assembly is elevated to a horizontal position for transport of the waste storage tank to a location for disposal and cleansing.

The transport rack and attachment to the camper provide a novel and unique transport rack with uses not found nor anticipate in the any of the prior art alone or in combination.

II. SUMMARY OF THE INVENTION

Camping vehicles generally provide storage tanks for collection of liquid waste in the form of grey water collection tanks and/or black water collection tanks. Depending on the campground, they may provide for connection of a hose for direct disposal, allow for deposit of the liquid waste in a designated waste collection location, or even allow for disposal onto the ground. In some instances, they have no accommodation for liquid waste disposal for local, state of federal guidelines or regulations. In the instances where there are no local accommodations for liquid waste disposal, the camper is required to collect their waste in either a camper holding tank or in a separate and portable liquid waste disposal tank for transport to a location where disposal is authorized or permitted. In this last example, the purpose and utility of the waste water container camper transport rack is observed.

The rack provides an elevating platform which may be placed flat upon the ground wherein a portable waste container may be located during the camping experience for collection of waste including grey water and/or black water. For purpose of this application, grey water is defined as water collected from sinks and showers which contain soaps or detergent water, while black water is primarily collected form the toilet and includes human waste. Generally, a camper has a grey water collection tank and a black water collection tank, the grey water tank being filled more frequently than the black water tank because of the greater quantity of fresh water used for cleansing and hygiene and not a much for toileting.

The transport rack defines a camper mounting member, installed either on the rear bumper, accessory hitch or other stabile camper frame member, a pivotal mounting assembly, an upper frame member defining two horizontal attaching arms, a lower L-extension, and a pivotally mounted platform, providing an upper surface to support a filled or empty portable waste disposal tank. The platform may be transferred from, a horizontal ground engaging position and elevated to a vertical transport position, the vertical transport position being secured by engagement of the platform with the two horizontal attaching arms of the upper frame member to maintain the sealed waste disposal tank between the platform and the upper frame member until such time as the waste disposal tank can evacuate its contents and be cleansed before further use.

III. DESCRIPTION OF THE DRAWINGS

The following drawings are submitted with this utility patent application.

IV. DESCRIPTION OF THE PREFERRED EMBODIMENT

Figure 1:
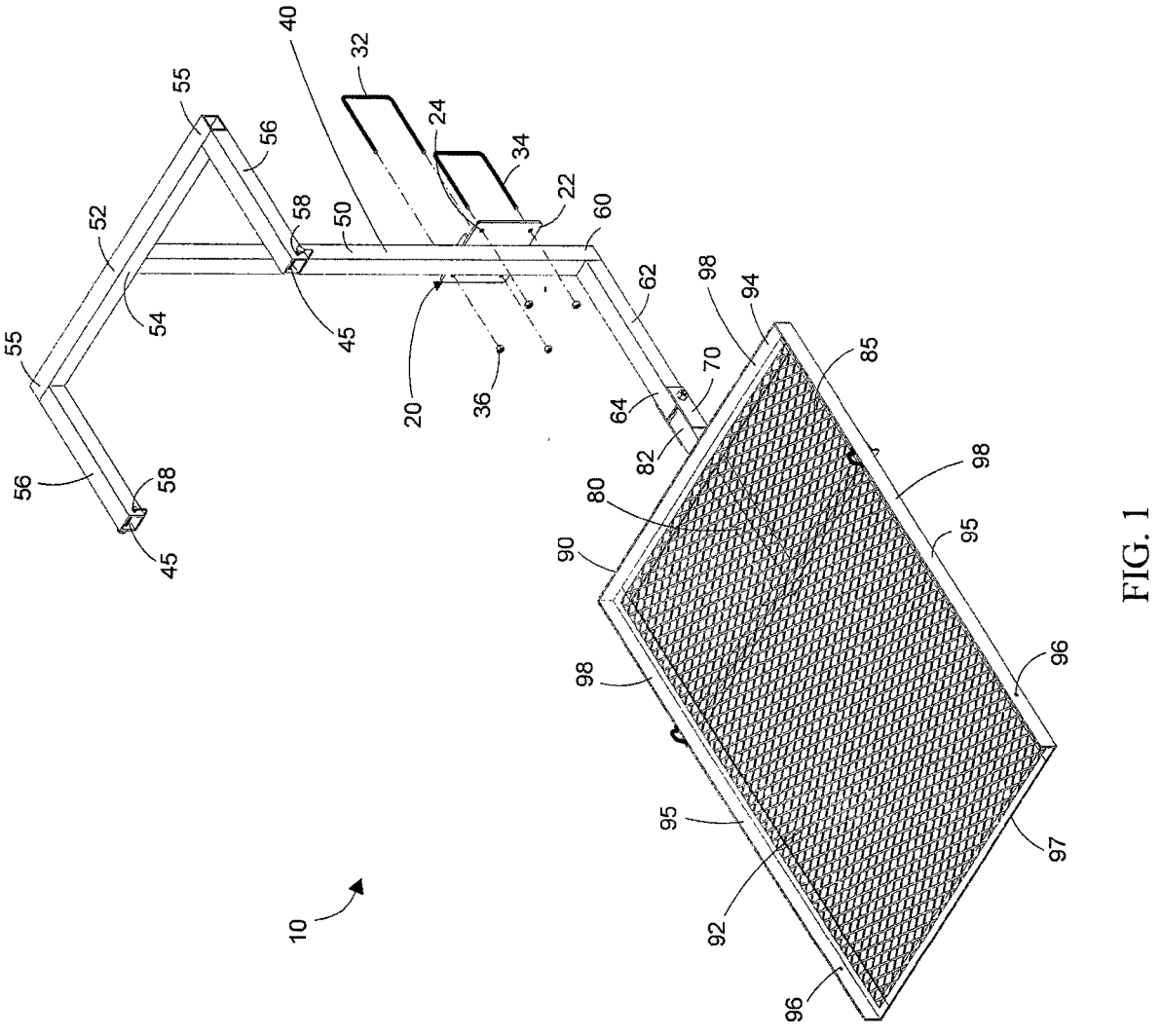
FIG. 1 is a front perspective view of the portable waste tank transport device in a lowered position.

A portable waste tank transport device 10 for a camper A, shown in FIGS. 1-6, attaches to a camper A to transport a portable waste tank C to a location where the portable waste tank C to be properly emptied of its contents and cleaned for further use. The tank transport device 10 is secured to a rear bumper B on the camper or installed within a square hitch receiver, not shown. As illustrated in the drawing figures, the embodiment included in the specification is primarily directed to a bumper attaching bracket assembly 20.

Figure 2:
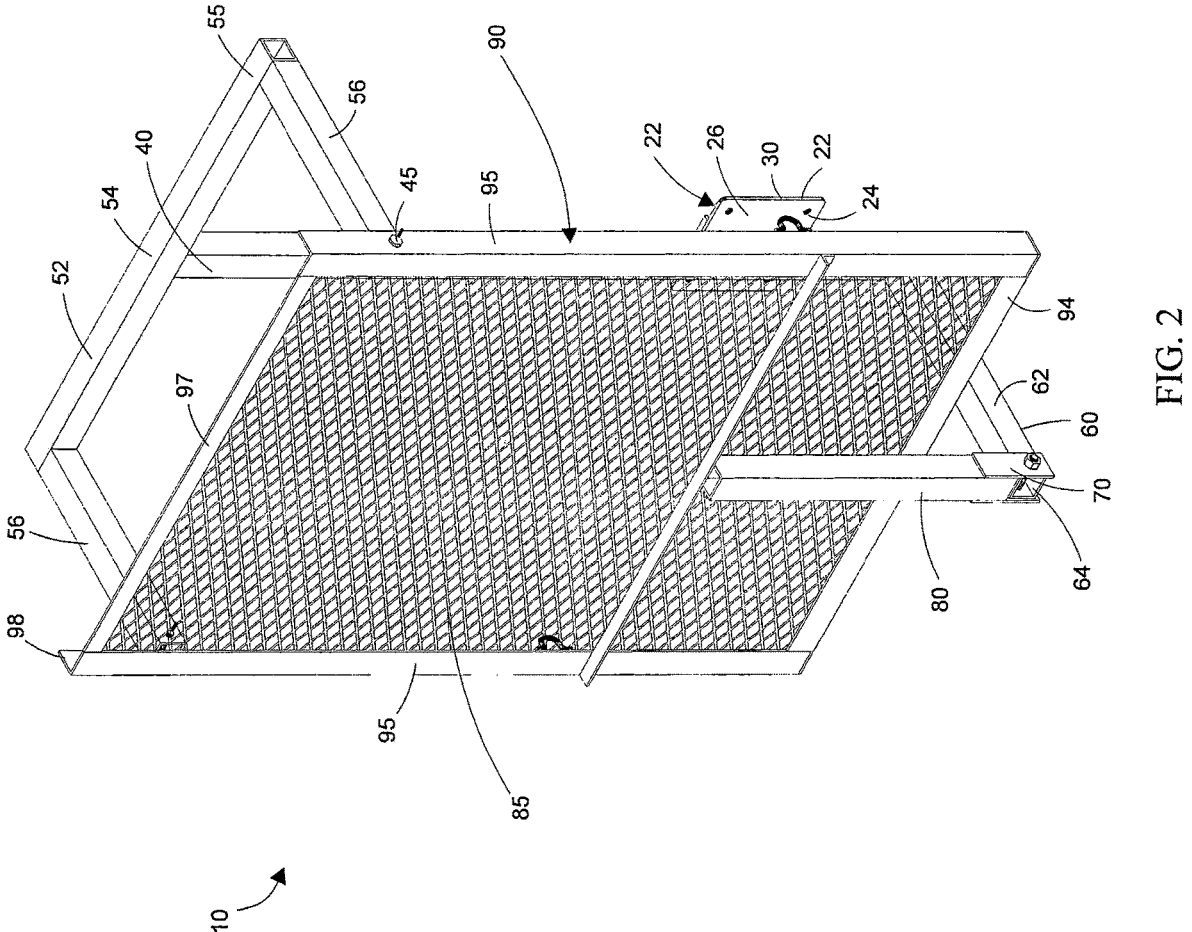
FIG. 2 is a front perspective view of the portable waste tank transport device in a raised and locked position.
Figure 3:
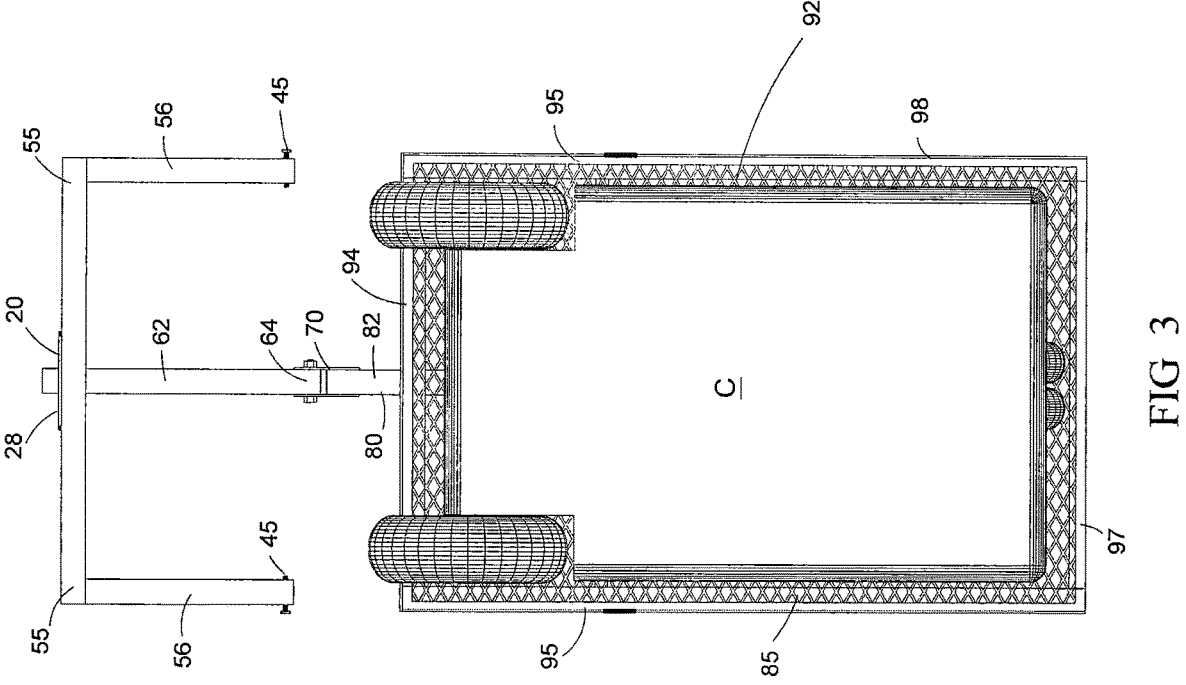
FIG. 3 is a top view of the portable waste tank transport device in a lowered position illustrating a portable waste tank upon the portable waste tank transport device.
Figure 3:
Figure 6:
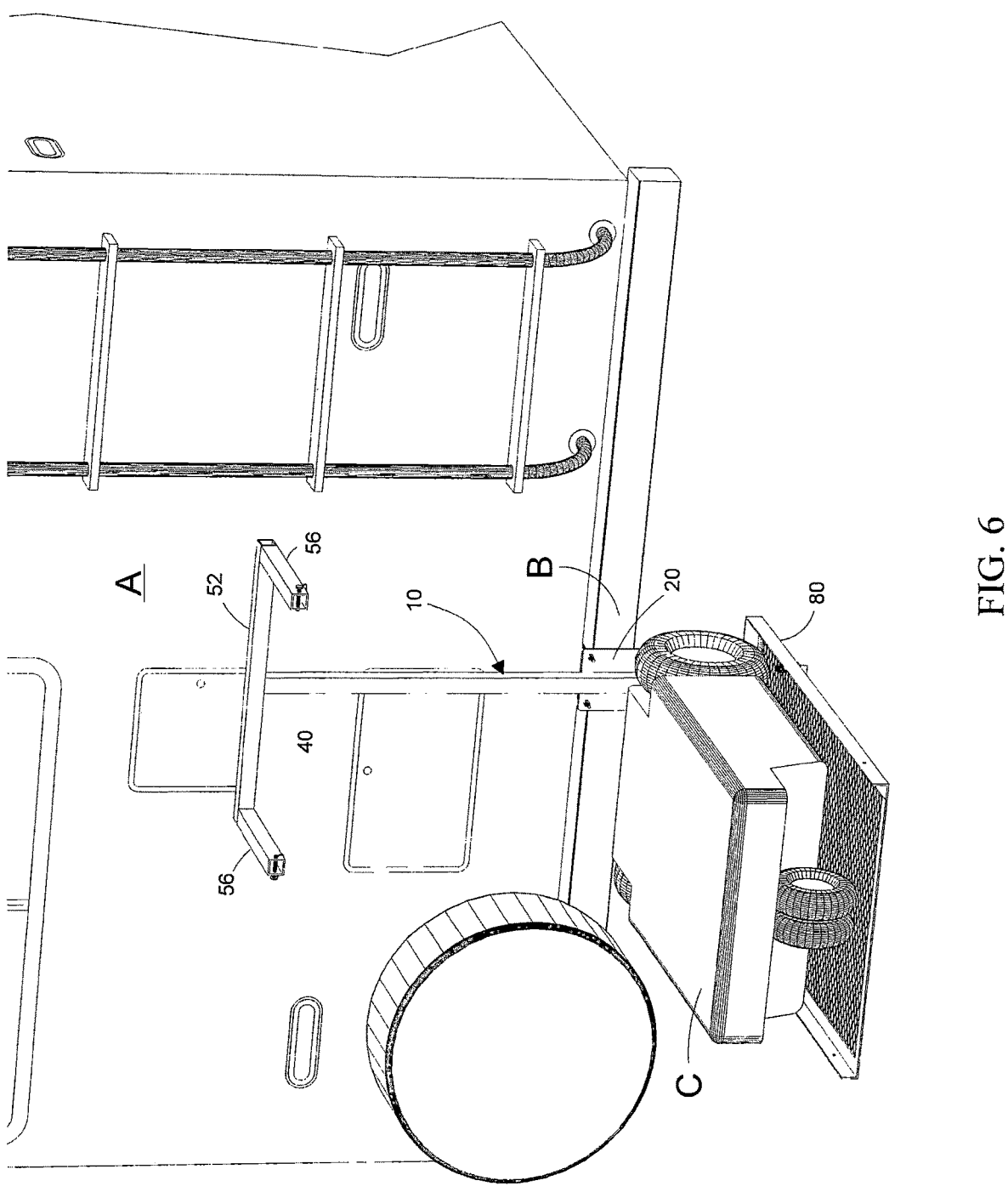
FIG. 6 is a front perspective view of the portable waste tank transport device in a lowered position and attached to the bumper of a camper with the portable waste tank placed upon the lower base frame support extension.

The tank transport device 10, shown in FIGS. 1-3, comprises a bracket plate 22 having at least two pair of vertically aligned clamp holes 24 which extend through a front surface 26 and rear surface 28 of the bracket plate 22 with a camper attaching means 30. In FIGS. 1 and 6, this camper attaching means 30 comprises a pair of C-clamps 32 which are secured around the camper bumper B and inserted through the rear surface 28 of the bracket plate 22, through the front surface 26, exposing threaded portions 34 of the C-clamps 32 and secured tightly by a respective nut 36.

Attached vertically to the front surface 26 of the bracket plate 22 is a primary vertical support bar 40 extending above and below the bracket plate 22 defining a lower section 60 and an upper section 50. The upper section 50 extends above the bracket plate 22 and attaches to a central portion 54 of a horizontal T-bar 52 having two ends 55, each end 55 outwardly extending a respective horizontal arm 56 perpendicular from the T-bar 52, each horizontal arm 56 defining a respective horizontal lateral pin hole 58.

The lower section 60 extends below the bumper B and further defines a lower horizontal extension segment 62 terminating in an end piece 64. A pivotal hinge 70 attaches between the end piece 64 and a lower base frame support extension 80, allowing for 90 degree hinged movement between a raised position, FIGS. 2, 4 and 5, and a lowered position FIGS. 1 and 3. Attached to an upper surface 82 of the lower base frame support extension 80 is a lower base frame 90 with an extruded metal plate 85 attached within the lower base frame 90 which an upper surface 92, FIGS. 1 and 3. The lower base frame 90 is preferably made from angled metal and flat metal and further defines an angular proximal frame member 94, two parallel angular side frame members 95 with respective pin bores 96 and a flat frontal frame member 97 made of a flat metal, with the junctions of the frame members 94, 95, 97, secured together by welding or other means, providing the angular proximal frame member 94 and two angular side frame members 95 with an upward extending outer edge 98, FIG. 1. The upper surface 92 of the lower base frame thereby provides a ground supported platform upon which the portable waste transfer tank C may be rolled upon in the lowered position prior to transport in the raised position.

Whether the portable waste transfer tank C is empty or full, the new and useful transfer process for the waste tank would include the step comprising:

1. Installing the portable waste tank transport device 10 on the camper A at a preferred location;
2. Lowering the lower base frame 90 to the lowered position, placing the lower base frame on the ground below the camper A;
3. Rolling the portable waste tank C onto the extruded metal plate 85/upper surface 92 on the lower base frame 90;
4. Raising the lower base frame 90 with the portable waste tank C into the raised position;
5. Securing the lower base frame 90 between the horizontal arms 56 of the T-bar 52 and placing respective pins 45 within the respective lateral pin holes 58 and pin bores 96 to lock the lower base frame 90 into the raised position during transport.

The lengths of the primary vertical support bar 40, the respective length of the upper section 50 and lower section 60, the lengths and dimensions of the lower frame member all depend upon the height of the camper A to which the portable waste transfer tank transport device 10 is adapted to. However, the lower base frame 90 must be able to be placed in the lowered position with the lower base frame 90 resting upon a ground surface.

The lowered position is the preferred position during the loading and unloading process of the portable waste tank C, FIG. 3. The raised position is the only position appropriate for transport of the portable waste tank C or during camper travel movement, FIG. 5. The raised position may also be the appropriate position during the disposal of waste from the portable waste tank C and the cleansing of the portable waste tank C, not shown.

Regarding modification of the portable waste transfer tank transport device 10 to suitable fit into a square receiver hitch would require the rear surface 28 of the bracket plate 22 with a square receiver extension which is adapted for fit within a square receiver hitch and is secured within the square receiver hitch by a receiver hitch pin, not shown in the drawing figures, but a contemplated modification of the camper attaching means 30. The bracket plate may also bolt directly to the camper bumper B using threaded screws or simply welding the bracket plate 22 to another camper item having the capacity to support the tank transport device 10 and a full portable waste tank, also not shown.

Figure 4:
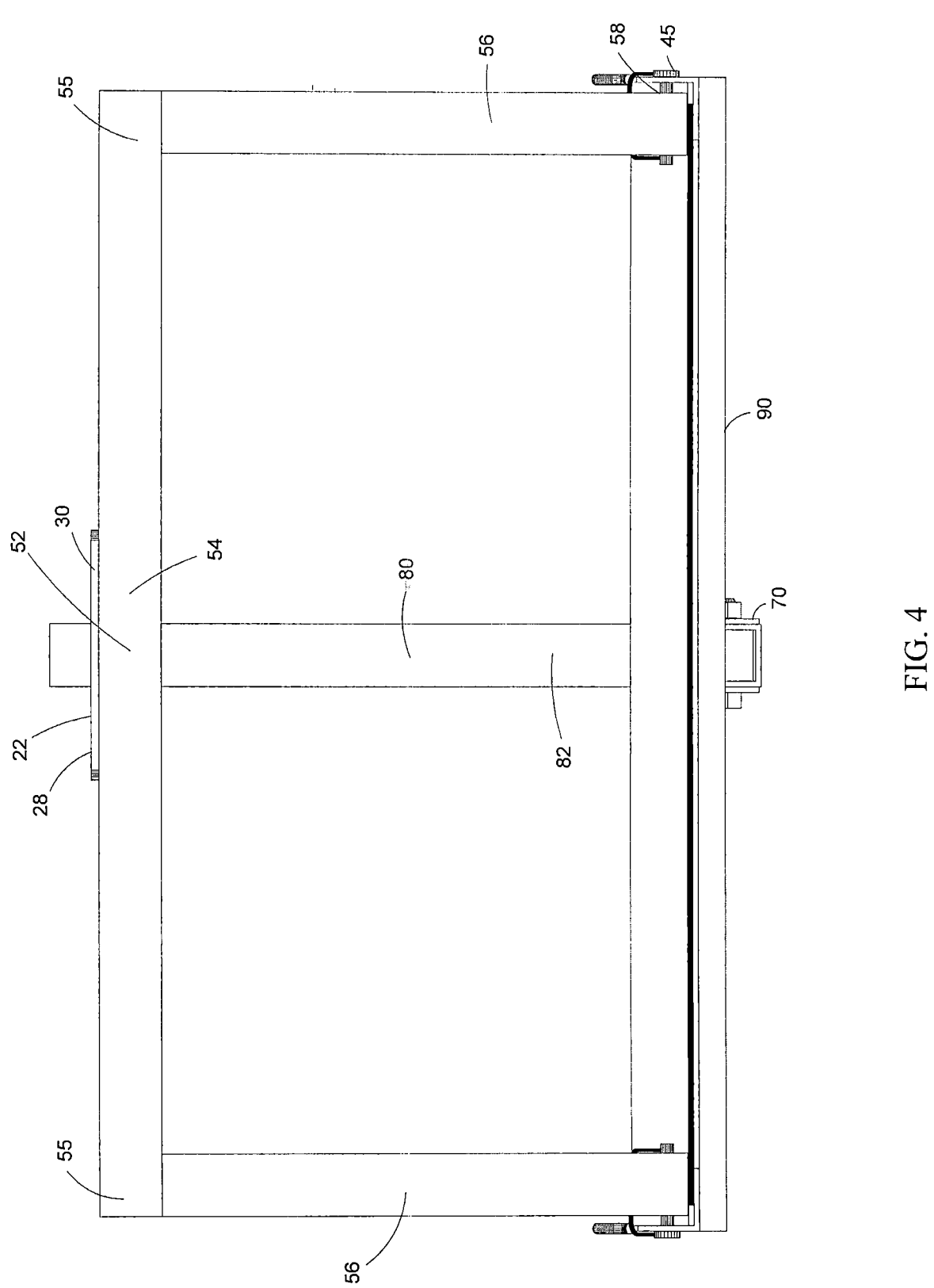
FIG. 4 is a top view of the portable waste tank transport device in a raised and locked position.
Figure 5:
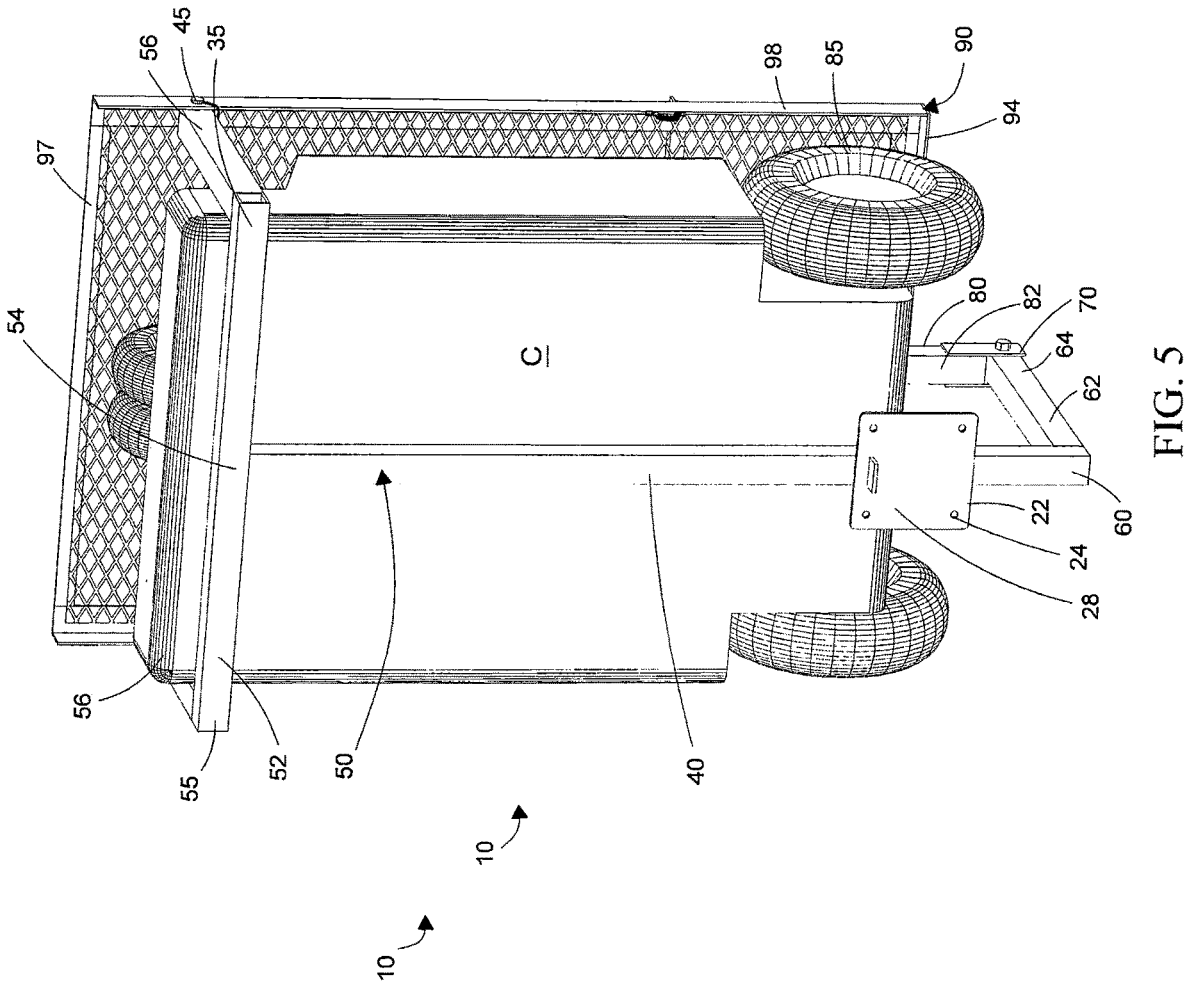
FIG. 5 is a rear perspective view of the portable waste tank transport device in a raised position illustrating the portable waste tank secured within the portable waste tank transport device.

Other support structures may be provided as addition frame support, additional extruded metal plate intermediary support members. Additionally, as shown in FIGS. 2 and 4, the lateral pin hole 58, when the raised position places the lower base frame 90 between the two horizontal arms 56 of the T-bar 52 with respective pins 45 places through the horizontal lateral pin holes 58 and aligned pin bores 96 in the angular side frame members 95 of the upward extended outer edges. 98 of the lower base frame 90 to lock the lower base frame into the raised position during transport, with or without the portable waste tank C. The pins 45 may be a nut and bolt, a cotter pin or a linch pin, FIGS. 1-5.

While the portable waste tank transport device 10 for a camper A has been particularly shown and described with reference to a preferred embodiment thereof, it will be understood by those skilled in the art that changes in form and detail may be made therein without departing from the spirit and scope of the invention.

What is claimed is:

1. A portable waste tank transport device for a camper attaches to the camper to transport a wheeled portable waste tank to a location where the wheeled portable waste tank is properly emptied of its contents and cleaned for further use, said portable waste tank transport device comprising:

a bumper bracket assembly attached to bumper of said camper defining a front surface and a rear surface;

a primary vertical support bar defining an upper section and a lower section, said upper section further defining a horizontal T-bar with a central portion attached to said primary vertical support bar and having two ends extending a pair of parallel horizontal arms including respective later pin holes, while said lower section defines a lower horizontal extension segment terminating in an end piece;

a lower base frame support extension defining an upper surface and connected to said lower horizontal extension segment by a hinge that provides said lower base frame support extension to be raised and lowered from a horizontal position to a ninety degree vertical upward arc;

a lower base frame attached to said upper surface of said lower base frame extension defining an angular proximal frame member, a pair of angular side frame members with respective aligned pin bores, and a flat front frame member connecting to form said lower base frame and defining an upper surface attaching an expanded metal plate, wherein said wheeled portable waste tank is rolled upon said expanded metal plate in a lowered position, elevated to a raised position for transport, with said lower base frame in the raised position locked in place by placement of pins inserted through aligned and respective lateral pin holes and pin bores during transport securing said wheeled portable waste tank within said portable waste tank transport device in said raised position.

2. The portable waste tank transport device of claim 1, said bumper bracket assembly further comprising a bracket plate defining a pair of vertically aligned clamp holes through which respective C-clamps are installed from said rear surface to said front surface capturing said bumper of said camper within both said C-clamps and secured by nuts engaging respective threaded ends of said C-clamps.

3. The portable waste tank transport device of claim 1, further comprising said lower base frame defines an upward extending outer edge formed from the connection of said angular proximal frame member and said angular side frame members to further laterally secure said wheeled portable waste tank upon said lower base frame and maintain alignment of said portable waste tank in both the lowered position and raised transport position, with said flat front frame member provided to allow said wheeled portable waste tank to be rolled off and upon said lower base frame without impediment.

* * * * *